US010185838B1

(12) United States Patent
Evans et al.

(10) Patent No.: US 10,185,838 B1
(45) Date of Patent: *Jan. 22, 2019

(54) METHODS TO IMPEDE COMMON FILE/PROCESS HIDING TECHNIQUES

(71) Applicant: SYMANTEC CORPORATION, Mountain View, CA (US)

(72) Inventors: Nathan Evans, Sterling, VA (US); Azzedine Benameur, Fairfaix, VA (US); Yun Shen, Bristol (GB)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,666

(22) Filed: Feb. 20, 2018

Related U.S. Application Data

(63) Continuation of application No. 14/831,681, filed on Aug. 20, 2015, now Pat. No. 9,898,615.

(51) Int. Cl.
*G06F 21/62* (2013.01)
*H04L 29/06* (2006.01)

(52) U.S. Cl.
CPC ...... *G06F 21/6209* (2013.01); *H04L 63/1441* (2013.01)

(58) Field of Classification Search
CPC .......................... G06F 21/6209; H04L 63/1441
See application file for complete search history.

(56) References Cited

U.S. PATENT DOCUMENTS

| 2002/0152226 | A1* | 10/2002 | Burnett | G06F 17/30067 |
| 2002/0162013 | A1* | 10/2002 | Burnett | G06F 21/6218 |
| | | | | 726/27 |
| 2008/0046977 | A1* | 2/2008 | Park | G06F 21/57 |
| | | | | 726/4 |
| 2011/0185429 | A1* | 7/2011 | Sallam | G06F 21/562 |
| | | | | 726/24 |
| 2011/0289600 | A1* | 11/2011 | Rusakov | G06F 21/55 |
| | | | | 726/30 |
| 2014/0283056 | A1* | 9/2014 | Bachwani | G06F 21/56 |
| | | | | 726/23 |
| 2016/0055337 | A1* | 2/2016 | El-Moussa | G06F 21/566 |
| | | | | 726/23 |
| 2016/0179546 | A1* | 6/2016 | Yamada | G06F 21/54 |
| | | | | 712/240 |

\* cited by examiner

*Primary Examiner* — Izunna Okeke
*Assistant Examiner* — Hee K Song
(74) *Attorney, Agent, or Firm* — Maschoff Brennan

(57) ABSTRACT

A processor-based method to defeat file and process hiding techniques in a computing device is provided. The method includes generating one of a path permutation, a symlink, or an address, for a path to open or obtain status of a tool or function in a library in a mobile computing device and making an open or status call for the tool or function, using the one of the path permutation, symlink or address. The method includes avoiding a pattern match and blocking, by an injected library, of the open or status call, the avoiding being a result of making the open or status call using the path permutation, symlink or address.

19 Claims, 3 Drawing Sheets

METHODS TO IMPEDE COMMON FILE/PROCESS HIDING TECHNIQUES

CROSS-REFERENCE TO A RELATED APPLICATION

This application is a continuation of U.S. patent application Ser. No. 14/831,681, filed Aug. 20, 2015, now U.S. Pat. No. 9,898,615, which is incorporated herein by reference in its entirety.

BACKGROUND

Smart phones can be rooted to gain privileged or administrative control or access, also called root access, to tools and functions otherwise unavailable. Rooted phones often use file or process hiding techniques such as path or library obfuscation so that unauthorized software is not visible. Unfortunately, malicious software can also be hidden using the same techniques. A common technique for hiding the presence of files or running applications is hooking libraries to block access to certain files. For example, on rooted ANDROID™ phones, one evasion technique is to hook open or status calls on system files. This prevents discovery of what applications are installed, and even prevents discovery of binaries that indicate the presence of malicious software or policy violation. Therefore, there is a need in the art for a solution which overcomes the file or process hiding techniques described above.

In some embodiments, a processor-based method to defeat file and process hiding techniques in a computing device is provided. The method includes generating one of a path permutation, a symlink, or an address, for a path to open or obtain status of a tool or function in a library in a mobile computing device and making an open or status call for the tool or function, using the one of the path permutation, symlink or address. The method includes avoiding a pattern match and blocking, by an injected library, of the open or status call, the avoiding being a result of making the open or status call using the path permutation, symlink or address.

In some embodiments, a method, performed by a processor in a smart phone, to circumvent file and process hiding techniques in rooted phones, is provided. The method includes performing one of permuting a path to open or obtain status of a tool or function in a library or creating a file that points to the tool or function, as a symlink and opening, or obtaining status of, the tool or function, via one of a permuted path from the permuting the path, or the symlink, with which the opening or obtaining status of the tool or function provides capability to circumvent pattern matching and blocking operations of an interposition library.

In some embodiments, a method to access a tool or function in the presence of file and process hiding techniques in mobile computing devices, performed by a processor in a mobile computing device, is provided. The method includes determining a tool or function in a library, to open or obtain status thereof, wherein the tool or function has a first file system path and determining a second file system path, differing in content or syntax from the first file system path. The method includes making an open call or a status call for the tool or function, using the second file system path as one of a path permutation of the first file system path, or a path that invokes a symlink, wherein the using the second file system path confers ability to evade pattern matching and blocking by an injected library of the mobile computing device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Methods and mechanisms to impede common file or process hiding techniques that use path of library obfuscation in smart phones, user devices and computers are herein described. These methods can be performed by processors of various devices, to call or obtain status of tools or functions in libraries, in the presence of an injected library that is using pattern matching and blocking to obscure unauthorized or malicious software. The methods and mechanisms use path permutation, symlinks, and/or address finding, in various combinations as further described below, to defeat or circumvent the pattern matching and blocking techniques used in library hooking and system modification.

Figure 1:
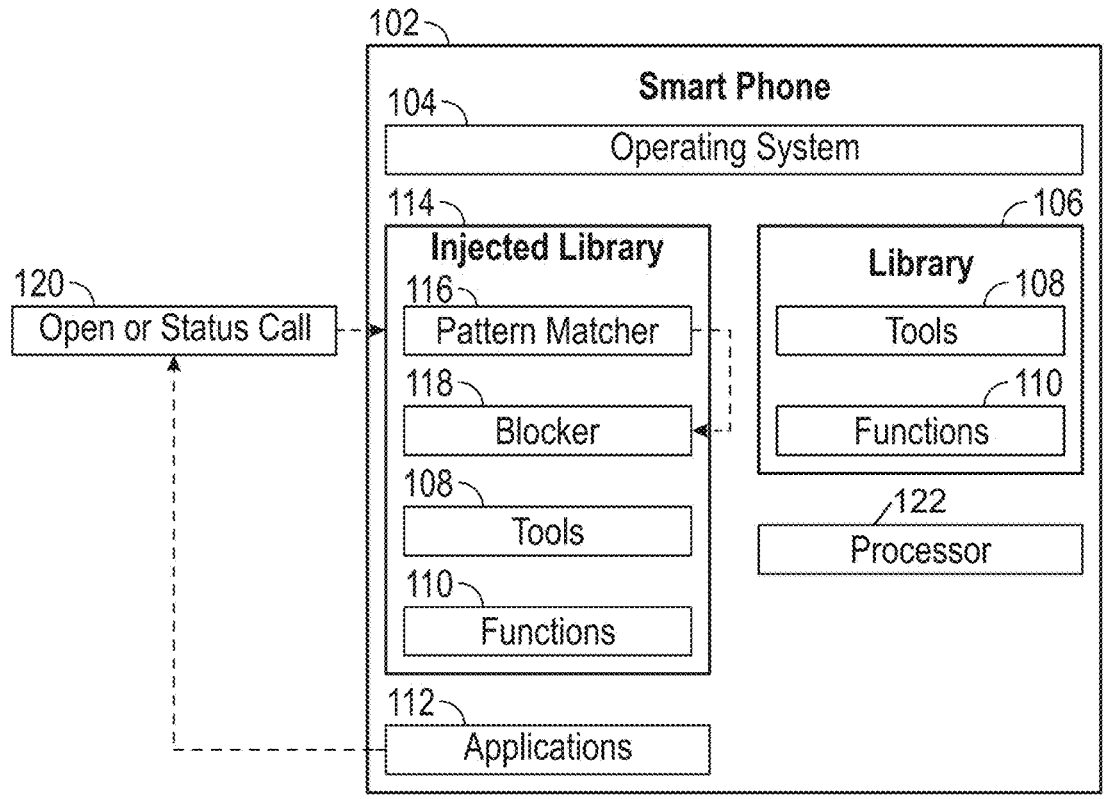
FIG. 1 depicts an example rooted smart phone, in which an injected library uses a pattern matcher and a blocker to block an open or status call attempting to open or obtain status of a tool in a library in accordance with some embodiments.

FIG. 1 depicts an example rooted smart phone 102, in which an injected library 114 uses a pattern matcher 116 and a blocker 118 to block an open or status call 120 attempting to open or obtain status of a tool 108 in a library 106. In various scenarios, the injected library 114 is functioning with the operating system 104 of the smart phone 102, but obscuring the use of tools 108 or functions 110 of the injected library 114 that are used for either unauthorized or malicious purposes. When an application 112 makes an open or status call 120 intended for a tool 108 or function 110 of a (legitimate) library 106, the injected library 114 hooks the open or status call 120. This is achieved by recognizing the open or status call 120 using the pattern matcher 116, and then applying the blocker 118 to block the open or status call 120 from accessing the intended tool 108 or function 110 in the library 106.

On LINUX™, UNIX™ and other UNIX™-like operating systems (referred to as *nix), access to common file system paths can be blocked by library hooking or system modification. For example, software that attempts to hide its presence may block open or opendir access to the /proc path, where information about running programs is contained. Such software may also block access to specific files under the /proc directory which are relevant to specific processes and represent a subset of this directory. Rooted phones often have non-system installed programs running as the root user. By manipulating access to the /proc directory and files in that directory, or access to other tools 108 or functions 110 of the library 106, the rooted phones can hide the presence of unauthorized files of the injected library 114.

Common tools like top, a UNIX™ root utility that provides a real-time view of multiple running processes, can be blocked by the pattern matcher 116 and blocker 118 when set up to recognize the path to the top utility. Another common tool, ps, which stands for process status, displays the currently operating processes, and can also be blocked by the pattern matcher 116 and blocker 118 when set up to recognize the path to the ps utility. Likewise, the UNIX™ system call stat, which returns file attributes about an Mode, could be blocked. Certain binary executable files are often blocked. For example, on ANDROID™ phones, rooted devices typically have a "su" binary file, that is blocked by the pattern matcher 116 and blocker 118 when set up to recognize the path to that executable file. In UNIX™, the su command, which stands for substitute user ID (identity), allows a user to execute a command with privileges of another user. When executed, this invokes a shell without changing the current working directory or the user environment. A rooted phone could use a su binary file to execute programs as root.

Blocking access to these and other files or directories is commonly done based on pattern matching of the path to the file or directory. An interposition library, such as the injected library 114 shown in FIG. 1, uses the pattern matcher 116 to check for paths that contain, for example, /proc, /system/bin, /usr/bin/su, etc. When any of these paths is detected by the pattern matcher 116, the blocker 118 blocks the return value. This is denoted in FIG. 1 by the blocker 118 blocking the open or status call 120 from opening or obtaining status about a tool 108 or function 110. Methods and mechanisms that work around or evade prevention of access to any paths, as implemented by a pattern matcher 116 using string-based pattern matching, are described below with reference to FIGS. 2-5.

Figure 2:
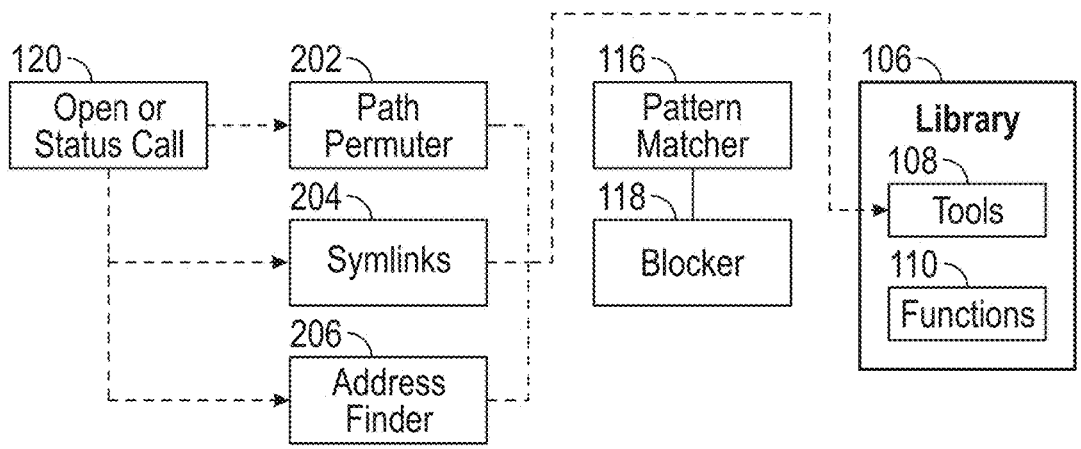
FIG. 2 depicts mechanisms that defeat or circumvent the pattern matcher and blocker, to open or obtain status of a tool in a library, in accordance with some embodiments.

FIG. 2 depicts mechanisms that defeat or circumvent the pattern matcher 116 and blocker 118, to open or obtain status of a tool 108 in a library 106, in accordance with present embodiments. These mechanisms, a path permuter 202, symlinks 204, and an address finder 206, can be used individually, or in various combinations. Associated methods are shown in flow diagrams in FIGS. 3-5. The path permuter 202 of FIG. 2 can be implemented as a function, for example in software executing on a processor 122 of a smart phone 102, or in hardware, firmware, or various combinations thereof. The path permuter 202 takes a path and returns a randomly permuted path which is equivalent, but which avoids common pattern matching checks. One embodiment, applicable to *nix directory entries, uses the "." character for the current directory, and the ".." character string for the parent directory, to augment paths prior to file system related calls such as open (e.g., to open a tool 108 or function 110), stat (e.g., to obtain status of a tool 108 or function 110), opendir (e.g., to open a directory), etc. For example, a path to open a command line, e.g.:

/proc/PID/cmdline could be returned from the path permuter 202 as:

/././proc/PID/../PID/././cmdline

The above permuted path differs in content and/or syntax from the originally presented path, and particularly has more up and down transitions through directory levels than the original path. Generally, the original path is the shortest, most direct and standard path in the file system to a tool 108 or function 110 of interest, and the permuted path is more convoluted and less direct. Moreover, the permuted path is not recognized by the pattern matcher 116 when the pattern matcher 116 is set to look for the originally presented path. However, the permuted path leads to or gets to the desired tool 108 or function 110, namely the command line in this example. Thus, an open call for the command line (e.g., as the desired tool or function), using either the originally presented path or the permuted path, results in a command line being brought up. While the originally presented path could be recognized by the pattern matcher, 116 when so set, the permuted path (as returned by the path permuter 202) would not be so recognized. The permuted path, and a call made using the permuted path, defeats or circumvents the pattern matcher 116 and blocker 118. Further examples, using other tools 108 or functions 110 of the library 106, and using an open call or a status call, with path permutation by the path permuter 202, are readily devised. Further types of path permutation are readily devised in keeping with the techniques herein.

Continuing with FIG. 2, to prevent more advanced string-based matching by a pattern matcher 116 from hooking a system call, files can be accessed using symlink 204. Symlink 204 is a special file that points to another file, so that when the symlink 204 is opened the referenced file is transparently accessed. A symlink 204 generator could be implemented as software, firmware, hardware, or a combination thereof, e.g., as a module. In order for an open or status call 120 to access a path, the symlink 204 generator first creates another path that differs from the original path in content and/or syntax, and sets up a symlink 204 (e.g., a special file) to point to the tool 108 or function 110 specified by the original path. The symlink 204 is then used for the open or status call 120, with the newly generated path invoking the symlink 204 and the symlink 204 accessing the referenced file. For example, an application 112 could attempt an open or status call 120 to access (e.g., read which files are in) the /proc directory, or access a file in that directory. The symlink 204 generator could create the random generated path:

/tmp/jjgo1432 which points to:

/proc in the symlink 204. An open or status call 120 specifying the path /tmp/jjgo1432 would defeat or circumvent a pattern matcher 116 and blocker 118 set to watch for /proc, and would access /proc via the symlink 204. Further examples, using other tools 108 or functions 110 of the library 106, and using an open call or a status call with a symlink 204, are readily devised.

Symlink 204 and the path permuter 202 can be combined, in a further embodiment. The symlink 204 generator uses a newly created path from the path permuter 202, to point to the directory or file. For example, to access the /proc directory, or a file under that directory, the system could set up a symlink 204 with a randomly generated path to invoke the symlink 204, and the symlink would include a pointer to a randomly permuted path that is based on, but differs in content and/or syntax from, the original/proc path, such as:

./././proc etc.

With continued reference to FIG. 2, a further mechanism for working around library hooking uses an address finder 206 for dynamically finding and then loading library addresses instead of calling tools 108 or functions 110 by name or path. Library hooking involves injecting a custom library (see injected library 114 in FIG. 1) with a function prototype that matches the intended one. An example of this is when the injected library 114 has another open( ) function 110, which the injected library 114 uses in place of the original in the library 106. Function lookup is done in the injected library 114 before the system library, so the injected library 114 can see the system call to the open( ) function 110 in the injected library 114.

Function hooking could be avoided by looking up the function in the library directly at runtime. There are two steps the address finder 206 performs to this procedure. First, the desired system library is loaded. For example, a call to:

lib=dlopen("/lib/libc.so")

could be used. Next, the desired function is looked up in the library, for example with a call to:

dlsym(lib, "open")

which returns the address of the "open" function 110. Using the address directly circumvents library hooking functions.

However, an injected library 114 may intercept dlopen( ) and dlsym( ) and block the use of these, preventing the look up of addresses of functions 110. An alternative mechanism of finding addresses is to find the address offset in the current process address space of dlopen( ) and dlsym( ) calls and then use those addresses to directly call those functions 110. For example, for ANDROID™ phones, the linker library contains the functions required for library lookup, e.g., dlopen( ) and dlsym( ) etc. First, the system finds the address where the linker is loaded in memory, which is readable from the/proc/self/maps pseudo-file. Next, the system determines offsets relative to the linker, for the functions required for library lookup, e.g., dlopen( ) and dlsym( ) etc. This is done by parsing the executable and linkable format (ELF) file for the desired function, e.g., dlopen( ) and dlsym( ) Alternatively, pre-calculated offsets could be gathered by looking at operating system releases for a particular product, product line or family of products, and the system could determine which offset to use for a specific situation. Once the linker address and the offset are determined, the address finder 206 determines the address for the desired function. Then, this address is called directly, for example to perform library lookup as described above. In turn, the library lookup can lookup other dynamic library functions, or addresses of these functions, and these addresses can be called directly. Use of the address finder 206 can be combined with use of the path permuter 202 and/or use of symlinks 204, to find where libraries are loaded. For example, a permuted path or a symlink 204 could be used to open or access the/proc file system, which can be used to find libraries or observe processes. Addresses could be found and provided to a symlink 204 or equivalent type of redirecting mechanism.

Figure 3:
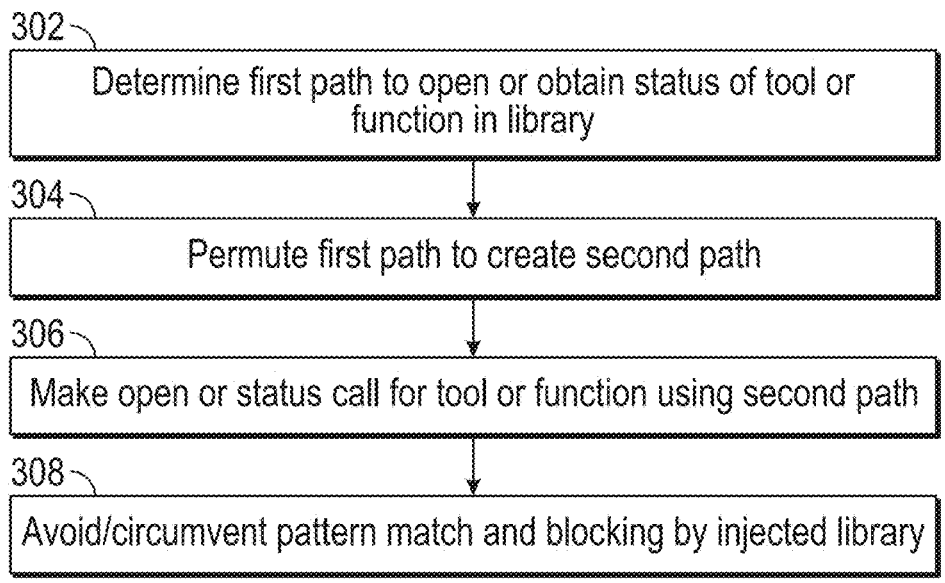
FIG. 3 is a flow diagram of a method for permuting paths, so as to defeat or circumvent a pattern matcher and blocker in a smart phone in accordance with some embodiments.

FIG. 3 is a flow diagram of a method for permuting paths, so as to defeat or circumvent a pattern matcher and blocker in a smart phone or other mobile computing device. The method can be practiced using the path permuter 202 as described above with reference to FIG. 2, and can be performed by a processor, such as a processor of a smart phone, a user device or a computer. In an action 302, a first path is determined to open or obtain status of a tool or function in a library. This is generally the shortest, most direct and standard path in the file system to the tool or function. In an action 304, the first path is permuted, to create a second path. The second path differs in content and/or syntax from the first path. In an action 306, an open or status call is made for the tool or function, using the second path. As a result of this mechanism, in the action 308, pattern matching and blocking by an injected library are avoided or circumvented.

Figure 4:
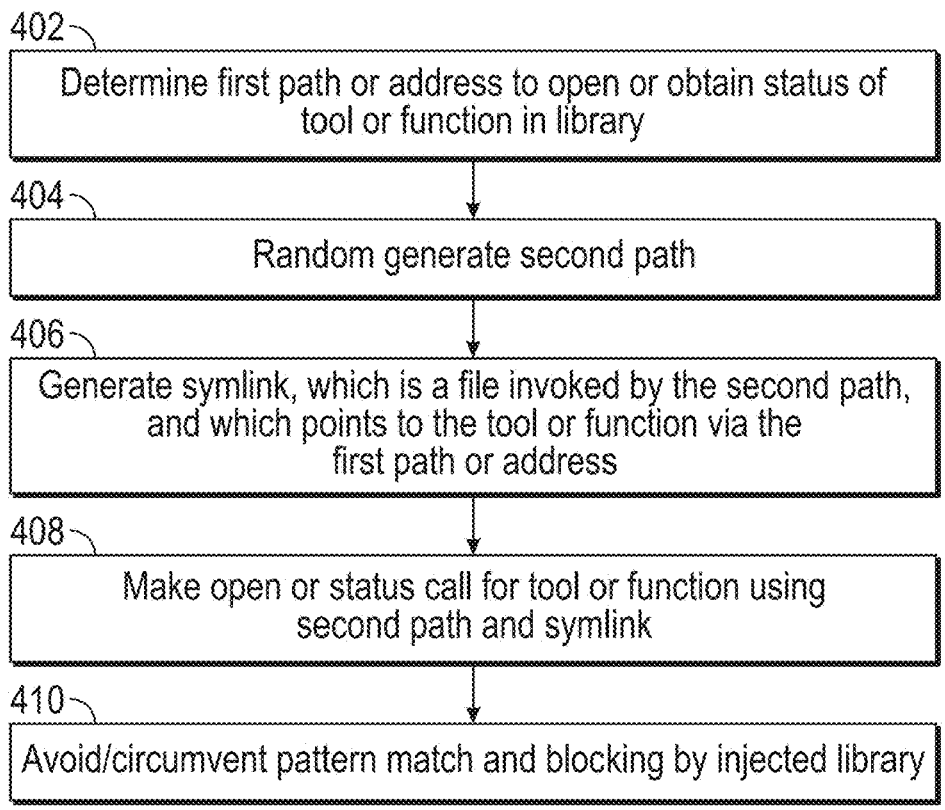
FIG. 4 is a flow diagram of a method for generating and using a symlink, so as to defeat or circumvent a pattern matcher and blocker in a smart phone in accordance with some embodiments.

FIG. 4 is a flow diagram of a method for generating and using a symlink 204, so as to defeat or circumvent a pattern matcher and blocker in a smart phone or other mobile computing device. The method can be practiced using the symlink 204 as described above with reference to FIG. 2, and can be performed by a processor, such as a processor of a smart phone, a user device or a computer. In an action 402, a first path or address is determined, to open or obtain status of a tool or function in a library. In an action 404, a second path is randomly generated. The second path differs from the first path in content and/or syntax. In an action 406, a symlink is generated. The symlink is a file invoked by the second path. The symlink points to the tool or function via the first path or the address. In an action 408, an open or system call is made for the tool or function, using the second path and the symlink. That is, the open or system call uses the second path, which invokes the symlink, and the symlink then accesses the tool or function via the first path or the address. As a result of this mechanism, in the action 410, pattern matching and blocking by an injected library are avoided or circumvented.

Figure 5:
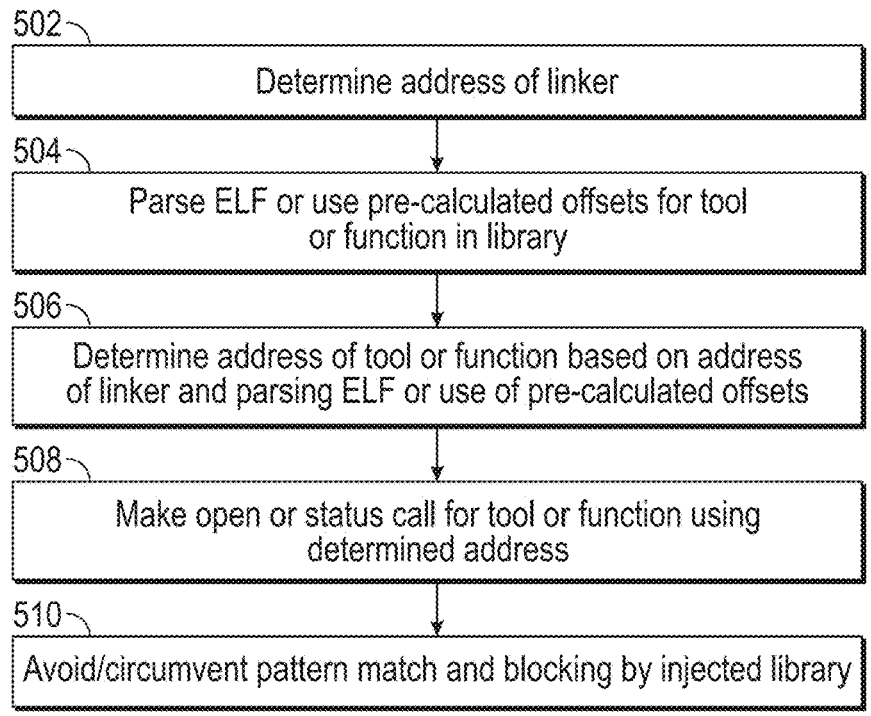
FIG. 5 is a flow diagram of a method for obtaining and using addresses, so as to defeat or circumvent a pattern matcher and blocker in a smart phone in accordance with some embodiments.

FIG. 5 is a flow diagram of a method for obtaining and using addresses, so as to defeat or circumvent a pattern matcher and blocker in a smart phone or other mobile computing device. The method can be practiced using the address finder 206 as described above with reference to FIG. 2, and can be performed by a processor, such as a processor of a smart phone, a user device or a computer. In an action 502, an address of a linker is determined. Preferably, the linker library contains functions of interest for library lookup. In an action 504, the executable and linkable format (ELF) file for the function of interest is parsed, and the offset for the function of interest is determined based on the parsing. In some embodiments, pre-calculated offsets are used, and the offset for the function of interest is determined from the pre-calculated offsets. In an action 506, based on the address of the linker and the offset determined from parsing the ELF or from the pre-calculated offsets, the address of the tool or function of interest is determined. In an action 508, an open or status call for the tool or function is made, using the determined address. As a result of this, in the action 510, pattern matching and blocking by an injected library are avoided or circumvented.

Figure 6:
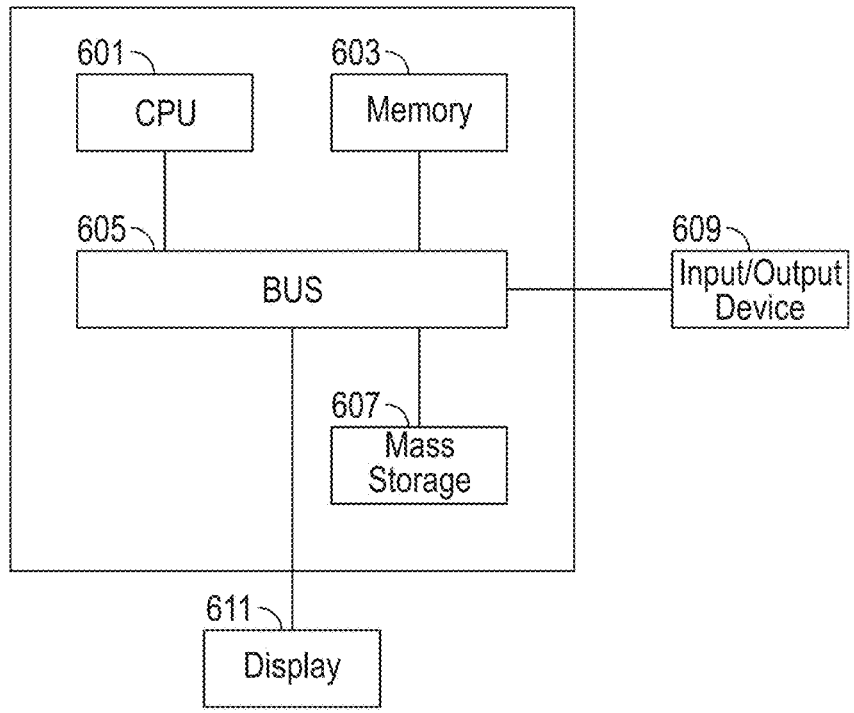
FIG. 6 is an illustration showing an exemplary computing device which may implement the embodiments described herein.

It should be appreciated that the methods described herein may be performed with a digital processing system, such as a conventional, general-purpose computer system or variation thereof, e.g., in a smart phone or other mobile computing device. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for accessing a tool or function in accordance with some embodiments. The computing device includes a central processing unit (CPU) 601, which is coupled through a bus 605 to a memory 603, and mass storage device 607. Mass storage device 607 represents a persistent data storage device such as a disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS DOS™, MS-WINDOWS™, ANDROID™, iOS™, OS/2™, UNIX™, LINUX™, or other known mobile operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

The invention claimed is:

1. A method to defeat file and process hiding techniques in mobile computing devices, at least a portion of the method being performed by a mobile computing device comprising one or more processors, the method comprising:
   determining a tool or function to be opened or to obtain status thereof, the tool or function being in a library and having a first file system path;
   determining an obfuscated second file system path usable to open or obtain status of the tool or function in the library, the obfuscated second file system path including a path permutation of the first file system path having more directory level transitions than the first file system path; and
   making an open call or a status call for the tool or function using the obfuscated second file system path, the use of the obfuscated second file system path avoiding pattern matching and blocking by an injected library of the mobile computing device.

2. The method of claim 1, wherein the obfuscated second file system path has at least a portion that is randomly generated.

3. The method of claim 1, wherein the using the obfuscated second file system path detects a file or a folder hidden by the pattern matching and blocking by the injected library.

4. The method of claim 1, wherein a "." character is included in the obfuscated second file system path to augment the first file system path for a current directory.

5. The method of claim 1, wherein a ".." character string is included in the obfuscated second file system path to augment the first file system path for a parent directory.

6. The method of claim 1, wherein the first file system path is a shortest path to the tool or function.

7. The method of claim 1, wherein:
   the injected library is configured to use the pattern match in function hooking; and
   the avoiding of the pattern match avoids the function hooking.

8. A method to defeat file and process hiding techniques in mobile computing devices, at least a portion of the method being performed by a mobile computing device comprising one or more processors, the method comprising:
   determining a tool or function to be opened or to obtain status thereof, the tool or function being in a library and having a first file system path;
   creating a symlink that points to the tool or function specified by the first file system path;
   determining an obfuscated second file system path usable to open or obtain status of the tool or function in the library, the obfuscated second file system path invoking the symlink and differing in content or syntax from the first file system path; and
   making an open call or a status call for the tool or function using the obfuscated second file system path, the use of the obfuscated second file system path avoiding pattern matching and blocking by an injected library of the mobile computing device.

9. The method of claim 8, wherein the obfuscated second file system path has at least a portion that is randomly generated.

10. The method of claim 8, wherein the using the obfuscated second file system path detects a file or a folder hidden by the pattern matching and blocking by the injected library.

11. The method of claim 8, wherein the first file system path is a shortest path to the tool or function.

12. The method of claim 8, wherein:
   the injected library is configured to use the pattern match in function hooking; and
   the avoiding of the pattern match avoids the function hooking.

13. A method to defeat file and process hiding techniques in mobile computing devices, at least a portion of the method being performed by a mobile computing device comprising one or more processors, the method comprising:
   determining a tool or function to be opened or to obtain status thereof, the tool or function being in a library and having a first file system path;
   determining an obfuscated second file system path usable to open or obtain status of the tool or function in the library, the obfuscated second file system path differing in content or syntax from the first file system path and including an address offset of the tool or function, the address offset of the tool or function being identified by:
determining an address for a linker;
determining an offset of a library lookup tool, relative to the linker;
calling the library lookup tool via the address for the linker and the offset; and
determining an address of the tool or function, based on the calling the library lookup tool;
making an open call or a status call for the tool or function using the obfuscated second file system path, the use of the obfuscated second file system path avoiding pattern matching and blocking by an injected library of the mobile computing device.

14. The method of claim 13, wherein the offset of a library lookup tool, relative to the linker is determined by parsing an executable and linkable format (ELF) file for the tool or function.

15. The method of claim 13, wherein the offset of a library lookup tool, relative to the linker is determined by using a pre-calculated offset for the tool or function.

16. The method of claim 13, wherein the obfuscated second file system path has at least a portion that is randomly generated.

17. The method of claim 13, wherein the using the obfuscated second file system path detects a file or a folder hidden by the pattern matching and blocking by the injected library.

18. The method of claim 13, wherein the first file system path is the shortest path to the tool or function.

19. The method of claim 13, wherein:
the injected library is configured to use the pattern match in function hooking; and
the avoiding of the pattern match avoids the function hooking.

* * * * *